(12) United States Patent
Miller

(10) Patent No.: US 7,548,429 B2
(45) Date of Patent: Jun. 16, 2009

(54) BATTERY STORAGE SYSTEM

(75) Inventor: Russell L. Miller, Boonville, NC (US)

(73) Assignee: Douglas Battery Manufacturing Company, Winston-Salem, NC (US)

( * ) Notice: Subject to any disclaimer, the term of this patent is extended or adjusted under 35 U.S.C. 154(b) by 373 days.

(21) Appl. No.: 11/343,643

(22) Filed: Jan. 31, 2006

(65) Prior Publication Data

US 2006/0152906 A1   Jul. 13, 2006

Related U.S. Application Data

(63) Continuation-in-part of application No. 10/872,299, filed on Jun. 18, 2004, now abandoned.

(51) Int. Cl.
*H05K 5/00* (2006.01)
*H01M 2/10* (2006.01)
*H01M 6/46* (2006.01)
*H01M 2/00* (2006.01)

(52) U.S. Cl. .......................... 361/724; 429/96; 429/99; 429/100; 429/153; 429/163

(58) Field of Classification Search ................. 361/724, 361/727, 730, 731, 735; 429/96, 99, 100, 429/153, 163; 312/223.1, 223.2
See application file for complete search history.

(56) References Cited

U.S. PATENT DOCUMENTS

| | | | |
|---|---|---|---|
| 1,487,856 A | 3/1924 | Hauserman et al. | 108/60 |
| 2,577,101 A | 12/1951 | Ball et al. | 312/107 |
| 3,272,581 A | 9/1966 | Stucki | 312/234.4 |
| 3,541,396 A | 11/1970 | Cardwell et al. | 361/803 |
| 4,056,295 A | 11/1977 | Downing | 312/107 |
| 4,317,497 A | 3/1982 | Alt et al. | 180/68.5 |
| 4,501,368 A | 2/1985 | Gill | 211/41.17 |
| 4,707,038 A | 11/1987 | Voegeli | 312/265.5 |
| 5,245,359 A | 9/1993 | Ito et al. | 346/139 R |
| 5,284,254 A | 2/1994 | Rinderer | 211/26 |
| 5,295,591 A | 3/1994 | Slater | 211/59.2 |
| 5,366,827 A | 11/1994 | Belanger et al. | 429/99 |
| 5,441,123 A | 8/1995 | Beckley | 180/68.5 |

(Continued)

OTHER PUBLICATIONS

Brochure: *PowerSafe DDM: Performance Specifications*, EnerSys, Ind., Reading, Pennsylvania, Jun. 2003.

(Continued)

*Primary Examiner*—Jayprakash N Gandhi
*Assistant Examiner*—Anthony M Haughton
(74) *Attorney, Agent, or Firm*—Womble Carlyle Sandridge & Rice, PLLC; C. Robert Rhodes

(57) ABSTRACT

The invention includes a storage rack for storing an array of battery cells in an uninterrupted power source (UPS). The rack at least meets the seismic testing requirements of NEBS GR-63-CORE (Issue 2 Apr. 2002). The rack includes a base module having pair of spaced end supports. Each end support includes opposed vertical frame members, opposed horizontal frame members, and a plate extending substantially continuously therebetween. At least one rail and a plurality of shelves extend between the end supports. The rail and shelves are welded to the end supports. The rack further includes at least one stack module configured to be stacked atop the base module and removably connected to the base module.

22 Claims, 17 Drawing Sheets

U.S. PATENT DOCUMENTS

| | | | |
|---|---|---|---|
| 5,590,939 A | 1/1997 | Piontek | 312/263 |
| 5,644,477 A | 7/1997 | Klein | 361/829 |
| 5,867,372 A | 2/1999 | Shie | 361/826 |
| 5,890,606 A * | 4/1999 | Kuipers | 211/186 |
| 5,936,371 A | 8/1999 | Bolash et al. | 318/685 |
| 5,981,101 A | 11/1999 | Stone | 429/100 |
| 6,120,934 A | 9/2000 | Linning, Jr. et al. | 429/175 |
| 6,126,022 A | 10/2000 | Merkel | 211/135 |
| 6,162,559 A | 12/2000 | Vutetakis et al. | 429/100 |
| 6,279,756 B1 | 8/2001 | Walter et al. | 211/26 |
| 6,310,783 B1 | 10/2001 | Winch et al. | 361/797 |
| 6,370,022 B1 | 4/2002 | Hooper et al. | 361/685 |
| 6,451,475 B1 | 9/2002 | Sherwood | 429/100 |
| 6,466,449 B1 | 10/2002 | Sheen et al. | 361/752 |
| 6,475,659 B1 * | 11/2002 | Heimer | 429/66 |
| 6,478,166 B2 * | 11/2002 | Hung | 211/26 |
| 6,482,541 B1 * | 11/2002 | Bator et al. | 429/100 |
| 6,483,270 B1 | 11/2002 | Miyazaki et al. | 318/700 |
| 6,719,150 B2 * | 4/2004 | Marraffa | 211/49.1 |
| 7,128,219 B2 * | 10/2006 | Marraffa | 211/49.1 |
| 2005/0084748 A1 | 4/2005 | Miller et al. | 429/99 |

OTHER PUBLICATIONS

Brochure: *Independence: Valve Regulated Lead-Acid Batteries*, EnerSys, Inc., Reading, Pennsylvania, May 2000.

* cited by examiner

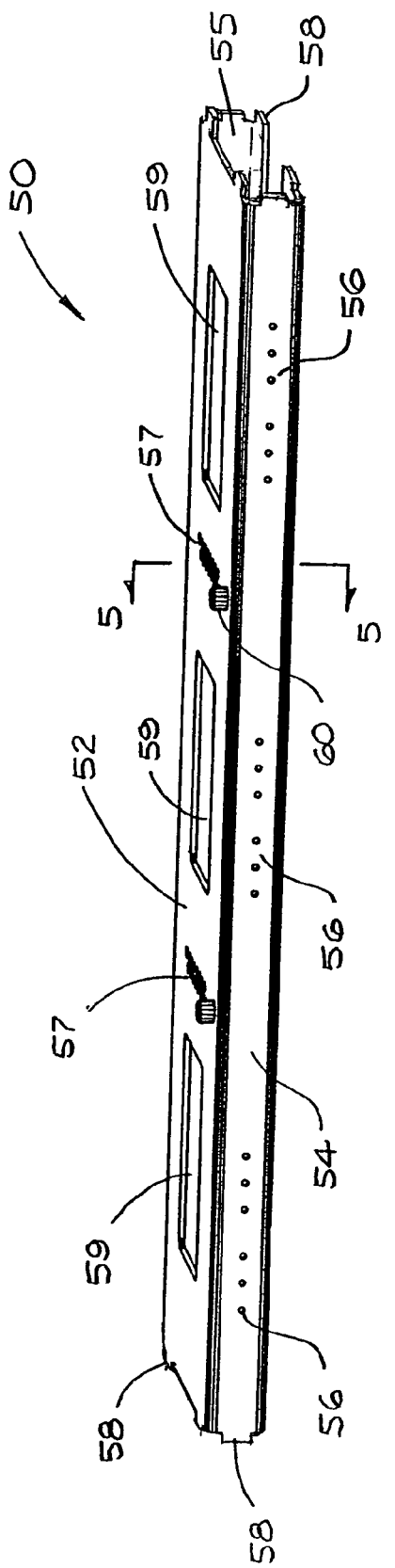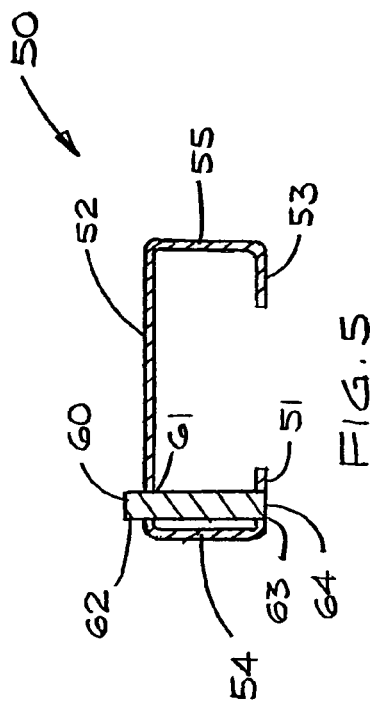

BATTERY STORAGE SYSTEM

RELATED APPLICATIONS

This application is a continuation-in-part of U.S. application Ser. No. 10/872,299, filed Jun. 18, 2004 now abandoned, which is hereby incorporated by reference.

FIELD OF THE INVENTION

The invention relates to storage systems and racks, and more particularly relates to a seismic-resistant rack and storage system that is particularly suited for securely storing an array of battery cells comprising an uninterruptible power source (UPS).

BACKGROUND

The telecommunications industry and other industries use backup power supplies or "uninterruptible power sources" (UPS's) to maintain operations when primary power sources fail or are interrupted. These UPS's are used to supply backup power to critical electrical and electronic equipment during primary power interruptions. Often these backup power sources include arrays of 2-volt valve-regulated lead acid battery cells (VRLA's). For example, a 48-volt backup power supply may include an array of twenty-four 2-volt VRLA's interconnected in series to supply backup power to critical equipment. Alternatively, a 24-volt backup power supply may include an array of twelve 2-volt VRLA's. These battery cells typically are supported on racks in a desired array. One such metal rack is described in U.S. Pat. No. 6,719,150. Such racks may support battery cells in a 3 by 8 array (48-volt array), or in a 3 by 4 array (24-volt array), for example, depending upon the desired or required amount of backup power.

The telecommunications industry has widely adopted a set of industry standards known as the NEBS ("Network Equipment—Building System") standards. The NEBS standards were developed by Bell Labs in the 1970's to standardize equipment that would eventually be installed in either an Incumbent Local Exchange Carrier (ILEC) or Regional Bell Operating Company (RBOC) Central Office. The NEBS standards basically describe the environment of a typical or generic RBOC Central Office. Bell Labs' intent in developing the NEBS standards was to make it easier for vendors to design and supply equipment compatible with a generic RBOC Central Office environment.

The main NEBS standard is Bellcore (now Telcordia) GR-63-CORE "Network Equipment—Building System (NEBS) Requirements: Physical Protection" Section 4.4, entitled "Earthquake, Office Vibration, and Transportation Vibration," provides generic criteria for earthquake, office vibration, and transportation vibration for telecommunications network equipment. Section 4.4.1 entitled "Earthquake Environment and Criteria" defines the seismic shaking conditions that must be withstood by a particular piece of equipment to be NEBS certified. This section requires the equipment to withstand a most severe "Zone 4 seismic event," which is approximately equivalent to an earthquake having a rating of 8.2 on the Richter scale. GR-63-CORE section 5.4.1 defines the waveform testing requirements necessary to demonstrate NEBS GR-63-CORE seismic compliance. As yet, there is no known backup battery rack or support system that complies with the NEBS GR-63-CORE seismic testing requirements. In particular, there is no known modular rack or storage system that meets NEBS GR-63-CORE seismic testing requirements and is adaptable in size to either 24-volt or 48-volt battery arrays.

Accordingly, there is a need for a backup battery storage system that complies with the NEBS GR-63-CORE (Issue 2 Apr. 2002) seismic testing requirements. Preferably such a system is adaptable to either a 24- volt or 48- volt array of battery cells. In addition, such a system should be efficient to construct, should occupy a minimum amount of space, and should be relatively affordable compared to non-NEBS certified storage systems.

SUMMARY

The invention includes a storage system or rack for receiving and supporting a plurality of battery cells, objects, or equipment in a spaced array. The storage system or rack is configured to meet or surpass the seismic testing requirements of NEBS GR-63-CORE, Section 4.1.1 (Issue 2, Apr. 2002).

The invention also includes a storage rack for storing an array of battery cells in an uninterrupted power source. The rack at least meets the seismic testing requirements of NEBS GR-63-CORE (Issue 2, Apr. 2002). The rack includes a pair of spaced end supports. Each end support includes opposed vertical frame members, opposed horizontal frame members, and a web extending therebetween. A plurality of shelves extend between the end supports. The shelves are welded to the end supports.

The invention further includes a modular rack for supporting a plurality of battery cells or other objects or equipment in spaced arrangement. The rack includes a base module configured to receive and support a first group of battery cells or other objects in a first spaced array, and a first stack module configured to receive and support a second group of battery cells or other objects in a second spaced array. The first stack module is configured to be stacked atop the base module and to be removably connected to the base module.

These and other aspects of the invention will be better understood from a reading of the following detailed description together with the drawings.

BRIEF DESCRIPTION OF THE DRAWINGS

FIG. 4 is a perspective view of a shelf portion of the base module shown in FIGS. 2A and 2B and the stack module shown in FIG. 6;

FIG. 5 is a cross-sectional view of the shelf support of FIG. 4 taken along section line 5-5 as shown in FIG. 4;

DETAILED DESCRIPTION

Figure 1:
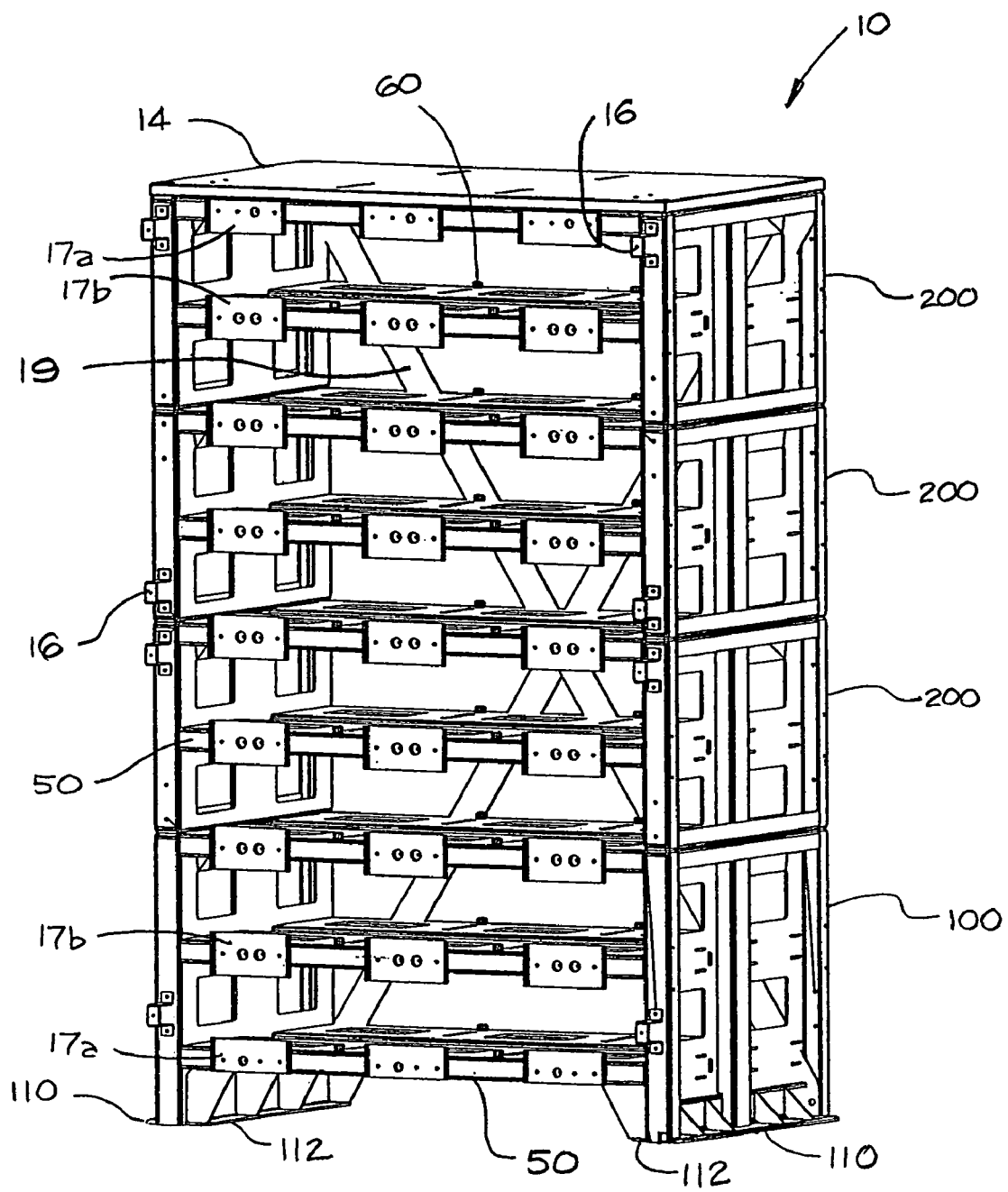
FIG. 1 is a perspective view of an embodiment of a rack according to the invention.

One embodiment of a seismic-resistant storage system or rack 10 according to the invention is shown in FIG. 1. The rack 10 includes a base module 100 and a plurality of stack modules 200 that are stacked and interconnected as shown. The modules 100, 200 include a plurality of vertically spaced horizontal support members or shelves 50 for securely supporting a plurality of objects such as battery cells in a spaced array. In a preferred embodiment, the rack 10 is sized and configured to securely support and store up to twenty-four conventional 2-volt telecommunications battery cells. The rack 10 includes base plates 110, 112 that are configured for removable attachment to a substantially planar foundation, floor, or the like. In the embodiment 10 shown in FIG. 1, the rack is configured to be bolted to a concrete foundation with concrete expansion anchors (not shown). A top cover 14 may be provided atop the uppermost stack portion of the rack 10. A plurality of brackets 16 may be provided on the front faces of the stacked modules 100, 200 for mounting a protective cover (not shown) over the front face of the rack 10. For example, the brackets 16 may be used to mount one or more transparent plastic panels over the front face of the rack (not shown). In order to provide added strength and rigidity to the rack 10, one or more cross braces 19 may be provided on the rear of the rack 10 as shown in FIG. 1.

The modules 100, 200 are removably connected together by threaded fasteners or the like. In a preferred embodiment, the modules 100, 200 are connected together with a plurality of 0.5 in.-13 bolts and nuts with a grounding washer on each side of the connection (not shown). The grounding washers act to lock the threaded connections, and also to electrically connect the modules 100, 200. The bolts and nuts preferably are either GR5 or GR8. In a preferred embodiment, the rack 10 is constructed of steel or another suitably strong and durable metal or other material. As described in detail below, the structural components of the base module 100 and each stack module 200 are substantially welded together.

The storage rack 10 shown in FIG. 1 is designed and constructed to meet or surpass the seismic testing requirements of NEBS GR-63-CORE, Section 4.1.1 (Issue 2, Apr. 2002). More specifically, the storage rack 10 is designed and constructed to sustain the waveform testing defined by NEBS GR-63-CORE, Section 5.4.1 without permanent structural or mechanical damage. "Permanent structural damage" is defined as "deformation of any load-bearing element of the equipment being tested, or any connection failure." (NEBS GR-63-CORE, Section 4.4.1.2). Examples of permanent structural damage include "bent or buckled uprights, deformed bases, cracks, and failed anchors or fastening hardware." (NEBS GR-63-CORE, Section 4.4.1.2). "Mechanical damage" is defined to be "any dislocation or separation of components." (NEBS GR-63-CORE, Section 4.4.1.2). Examples of "mechanical damage" include opened or partially opened doors, drawers, or covers. (NEBS GR-63-CORE, Section 4.4.1.2).

Figure 2A:
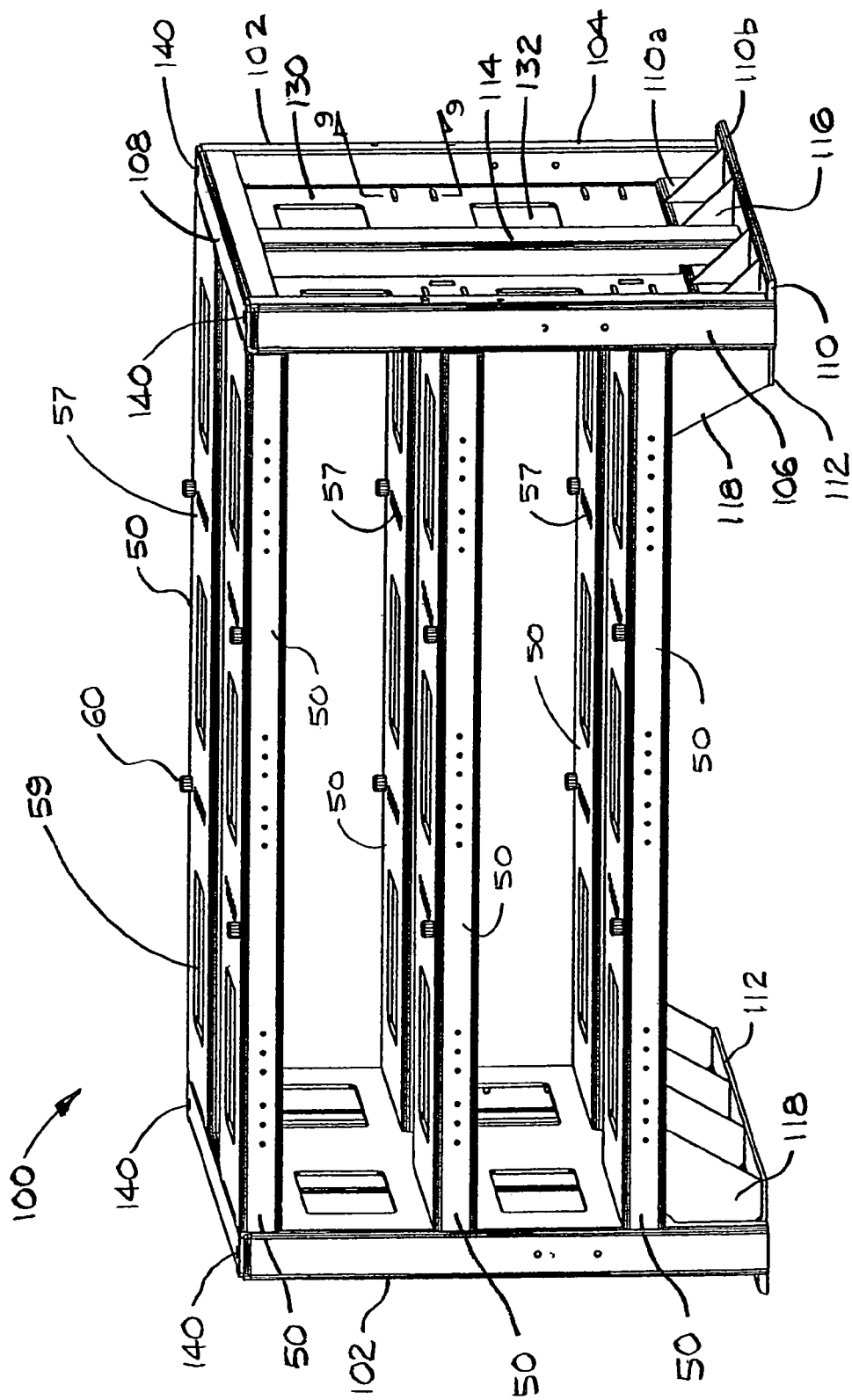
FIG. 2A is a front and top perspective view of a base module portion of the embodiment of a rack shown in FIG. 1.
Figure 2B:
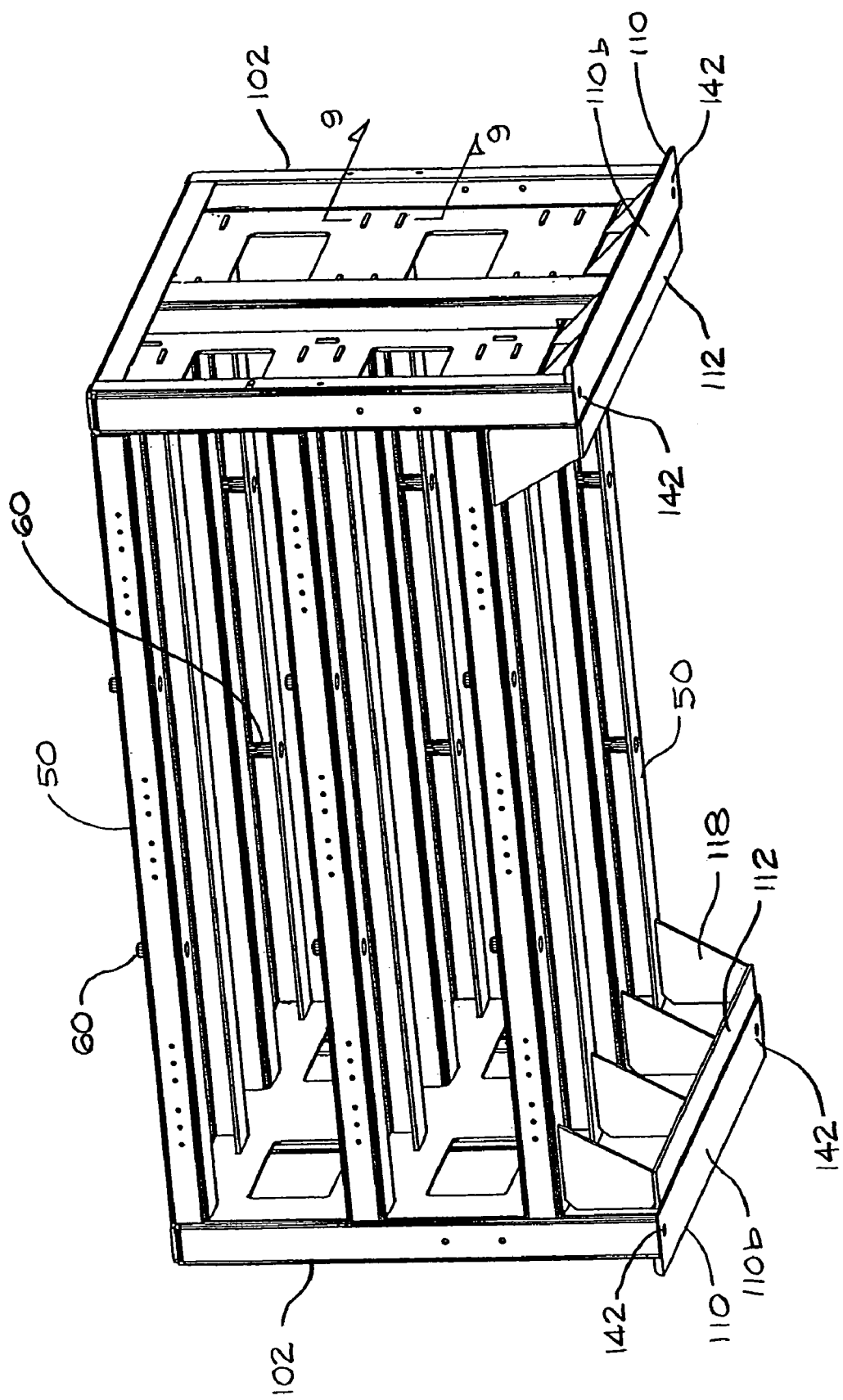
FIG. 2B is a front and bottom perspective view of a base module portion of the embodiment of a rack shown in FIGS. 1 and 2A.
Figure 3:
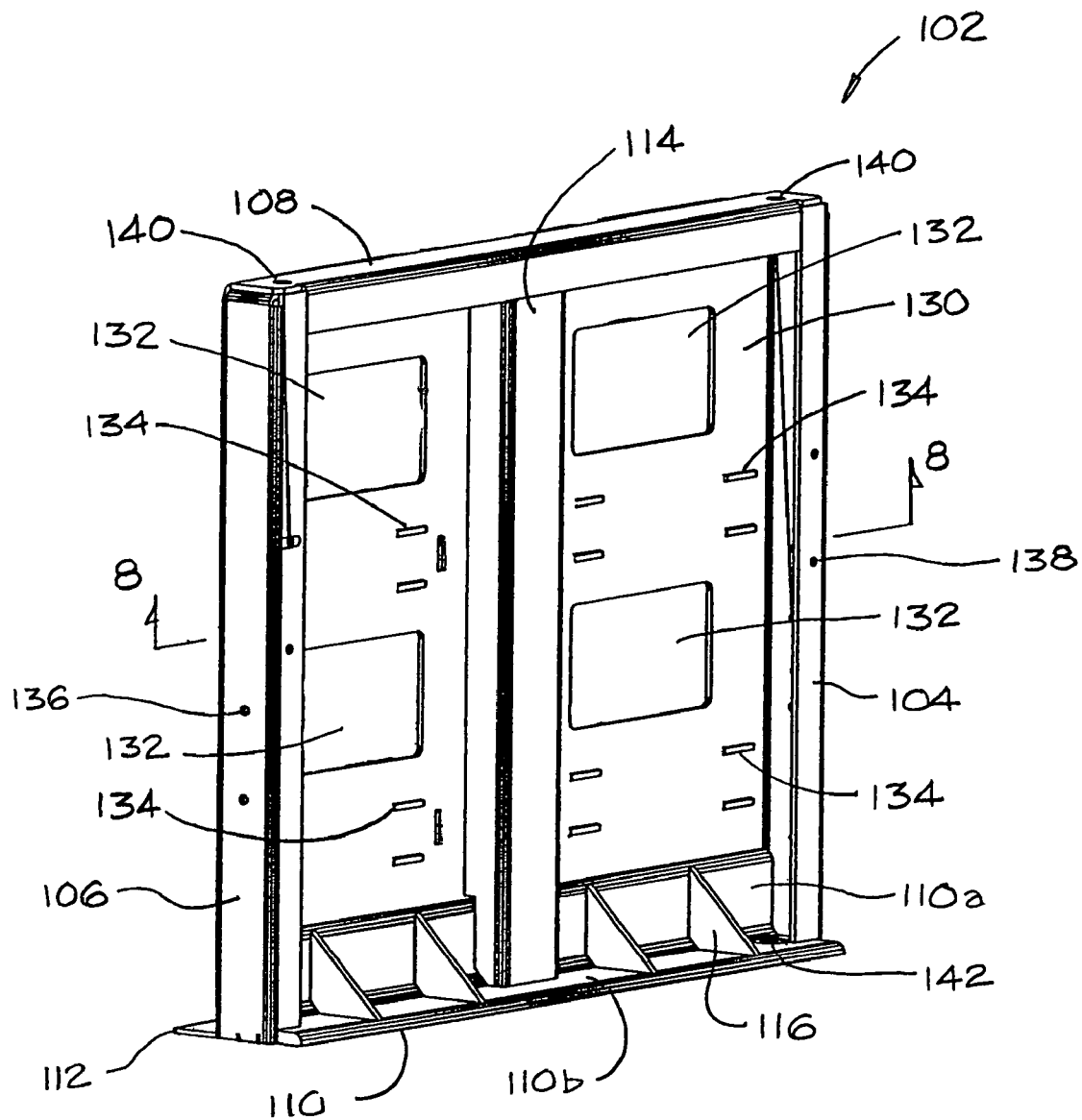
FIG. 3 is a perspective view of an end support portion of the base module shown in FIGS. 2A and 2B.

FIGS. 2A and 2B show one embodiment of a base module 100 for use in the rack 10 shown in FIG. 1. In this embodiment, the base module 100 includes a pair of opposed end supports 102. As shown in FIGS. 2A, 2B and 3, each end support 102 includes a pair of opposed vertical frame members 104, 106, an upper horizontal frame member 108, and a first lower horizontal frame member 112. A web 130 extends between the vertical frame members 104, 106 and horizontal frame members 108, 112. As shown in FIG. 3, the web 130 includes one or more window openings 132 and a plurality of shelf slots 134 therethrough. The window openings 132 reduce the weight of the web 130 and end support 100, and also permit cooling air flow to reach objects stored in the base module 200. In a preferred arrangement, the web 130, upper horizontal frame member 108, first lower horizontal frame member 112, and the vertical frame members 104, 106 are formed from a single sheet of continuous material. Alternatively, one or more of the upper horizontal frame member 108, first lower horizontal frame member 112, and the vertical frame members 104, 106, and web 130 may be separate components that are welded or otherwise affixed together.

Figure 8:
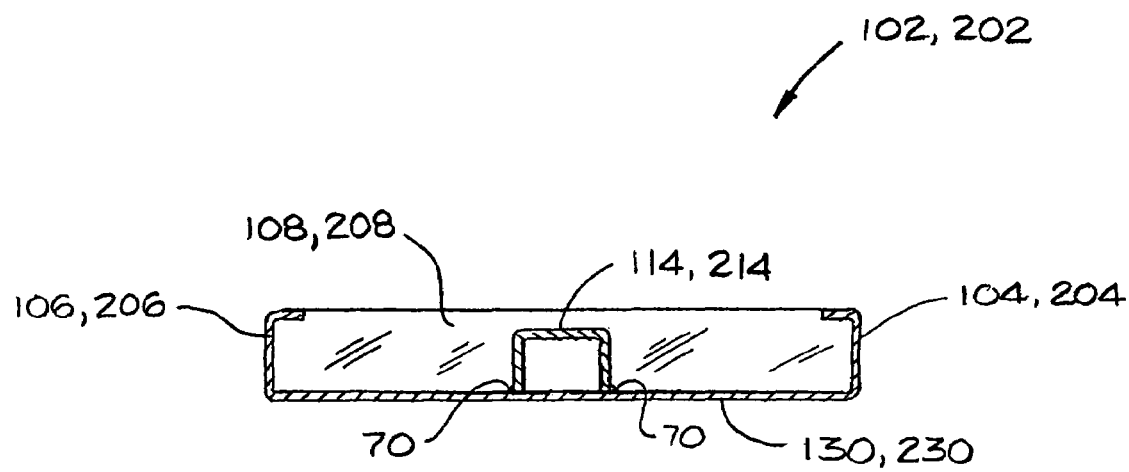
FIG. 8 is a cross-sectional view of the base module end support shown in FIG. 3 and the stack module shown in FIG. 7 taken along section line 8-8 as shown in FIGS. 3 and 7.

A vertical stiffening member 114 extends between the upper horizontal frame member 108 and the first lower horizontal frame member 112 along the outer face of the web 130. In one embodiment, the vertical stiffening members 114 are U-shaped channels that are welded 70 to the outer faces of the webs 130 as shown in FIG. 8.

A second lower horizontal frame member 110 includes a vertical leg 110a and a horizontal leg 110b. The horizontal leg 110b extends laterally outward from the bottom of the base end support 102 to provide the end support 102 and base module 100 with a stable footprint. The vertical leg 110a is at least welded to the web 130, and also may be welded to the vertical frame members 102, 106 and/or other adjacent components. As seen best in FIG. 2B, the second lower horizontal frame member 110 includes a hole 142 at each end for use in anchoring the base module 100 to a floor or foundation with concrete expansion anchors or the like. As shown in FIG. 3, a plurality of gussets 116 are welded between the legs 110a, 110b of the lower horizontal frame member 110 for strength and rigidity. To provide an even broader footprint for the base module 100, the first lower horizontal frame member 112 is an inwardly projecting plate that is substantially coplanar with the horizontal leg 110b of the second lower horizontal frame member 110. In the construction shown, the plate 112 and web 130 are formed from a common sheet of material. As shown in FIG. 2B, a plurality of inner gussets 118 are welded between the foot plate 112 and the adjacent shelves 50.

As shown in FIGS. 2A and 2B, the base module 100 further includes three pairs of horizontal shelves or horizontal support members 50 disposed between the end supports 102 in a spaced arrangement. The vertical spacing between adjacent shelves 50 is selected based upon the maximum height of objects to be supported on the shelves 50. For example, for supporting battery cells having a maximum height "x", the vertical spacing between adjacent shelves 50 preferably is slightly greater than "x". One embodiment of a shelf for use in the base module 100 and stack modules 200 is shown in FIGS. 4 and 5. In this embodiment, each shelf 50 substantially is constructed of a single sheet of material formed into a C-shaped channel (see FIG. 5). The shelf 50 includes a top panel 52, front and rear sidewalls 54, 55, and two inwardly-facing legs 51, 53. The top panel 52 preferably includes a plurality of window openings 59 and ventilation openings 57. In order to provide lateral support and desired spaces between adjacent objects stored on the shelves 50, a plurality spacer pins 60 are provided that upwardly extend through openings 61 in the top panel 52. Upper ends 62 of the pins 60 protrude above an upper surface of the top panel 52. Preferably, the pins 60 also have lower ends 64 that engage a mating opening 63 in the underlying leg 51 to provide added support for the pins 60.

Figure 9:
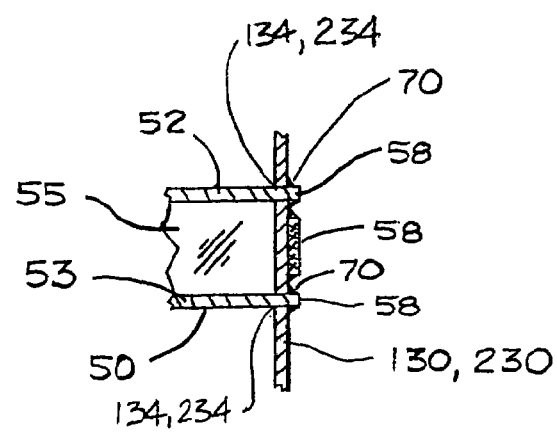
FIG. 9 is a cross-sectional view of the juncture between the shelf support of FIG. 4 and either the base module end support of FIG. 3 or the stack module end support of FIG. 7 taken along section lines 9-9 as shown in FIGS. 2 and 6.

Preferably, the shelves 50 are welded at each end to the associated end supports 102. In the embodiment of a shelf 50 shown in FIG. 4, each shelf 50 includes a plurality of tabs 58 laterally extending from each end of the shelf 50. As shown in FIGS. 2A, 2B and 9, the tabs extend through slots 134 in the web 130 of the end supports 102, and are welded 70 to the web 130. This welded-tab configuration provides the base module 100 with substantial strength and rigidity. The base module 100 is designed and constructed to meet or surpass the seismic testing requirements of NEBS GR-63-CORE, Section 4.1.1 (Issue 2, Apr. 2002).

Figure 11:
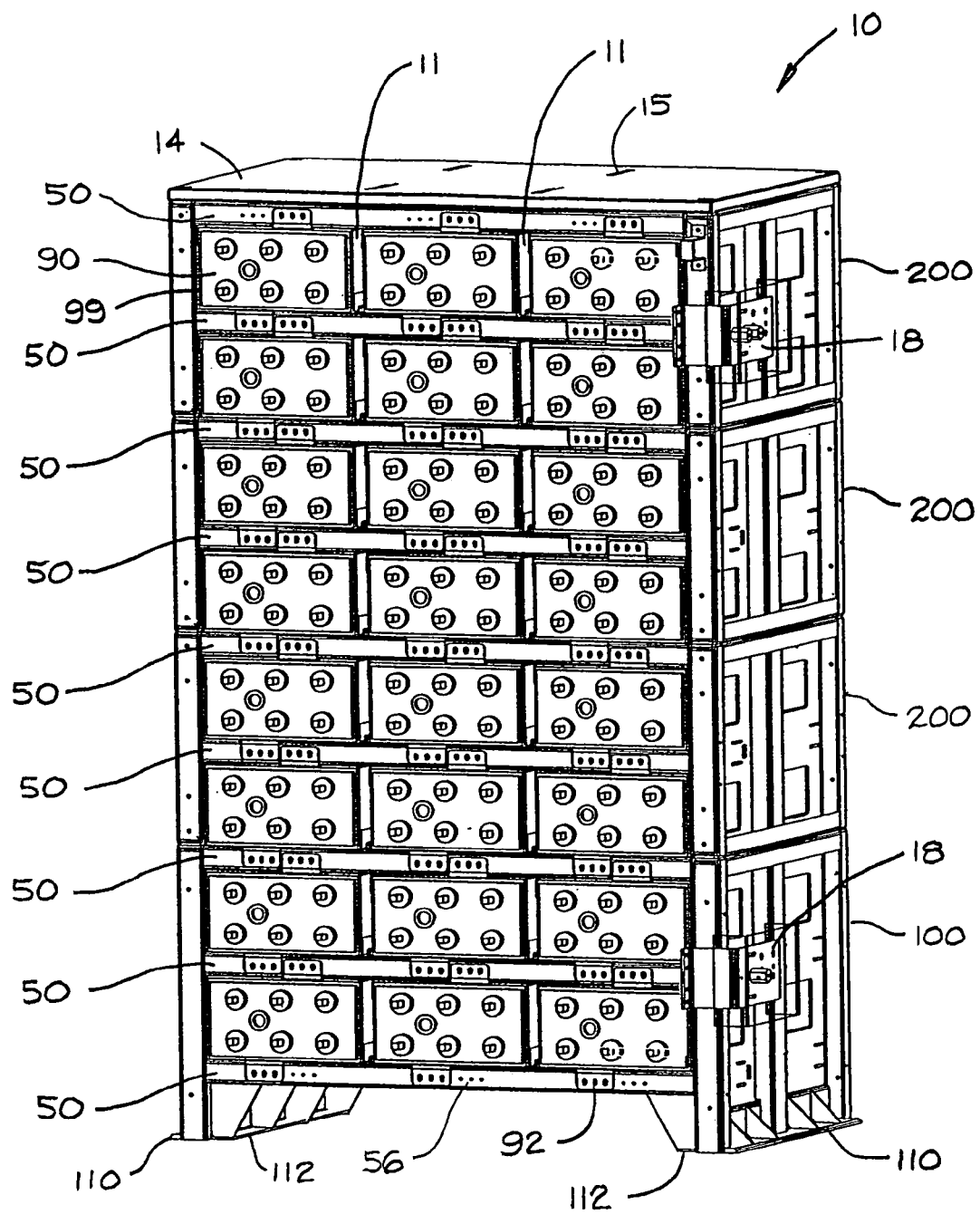
FIG. 11 is a perspective view of the embodiment of a rack as shown in FIG. 1 with a plurality of battery cells mounted therein.

As shown in FIGS. 2A and 4, several sets of aligned ventilation openings 57 may be provided in the shelves 50 in line with and adjacent to the spacer pins 60. These ventilation openings 57 permit air flow through the shelves 50 and the intermittent spaces defined between stored objects by the spacer pins 60. For example, when battery cells 90 are stored on the shelves 50 of the rack 10 as shown in FIG. 11, the pins 60 cause gaps 11 between adjacent battery cells 90. The ventilation openings 57 in the shelves 50 at these gaps 11 permit air that has been heated by the battery cells 90 to pass through the shelves 50 and to the top vent openings 15, thereby permitting waste heat from the battery cells to dissipate from the rack 10.

Figure 6:
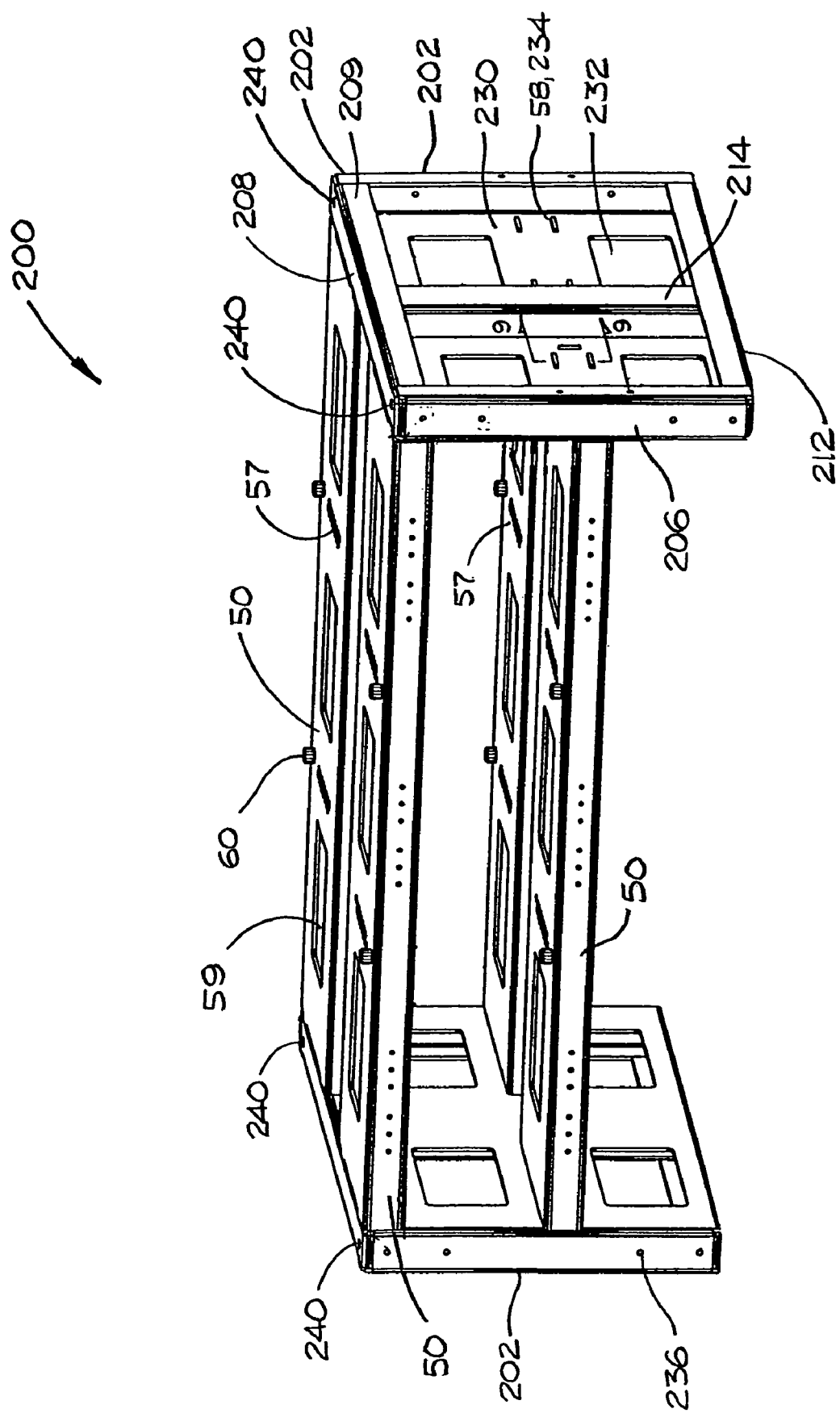
FIG. 6 is a perspective view of a stack module portion of the embodiment of a rack shown in FIG. 1.
Figure 7:
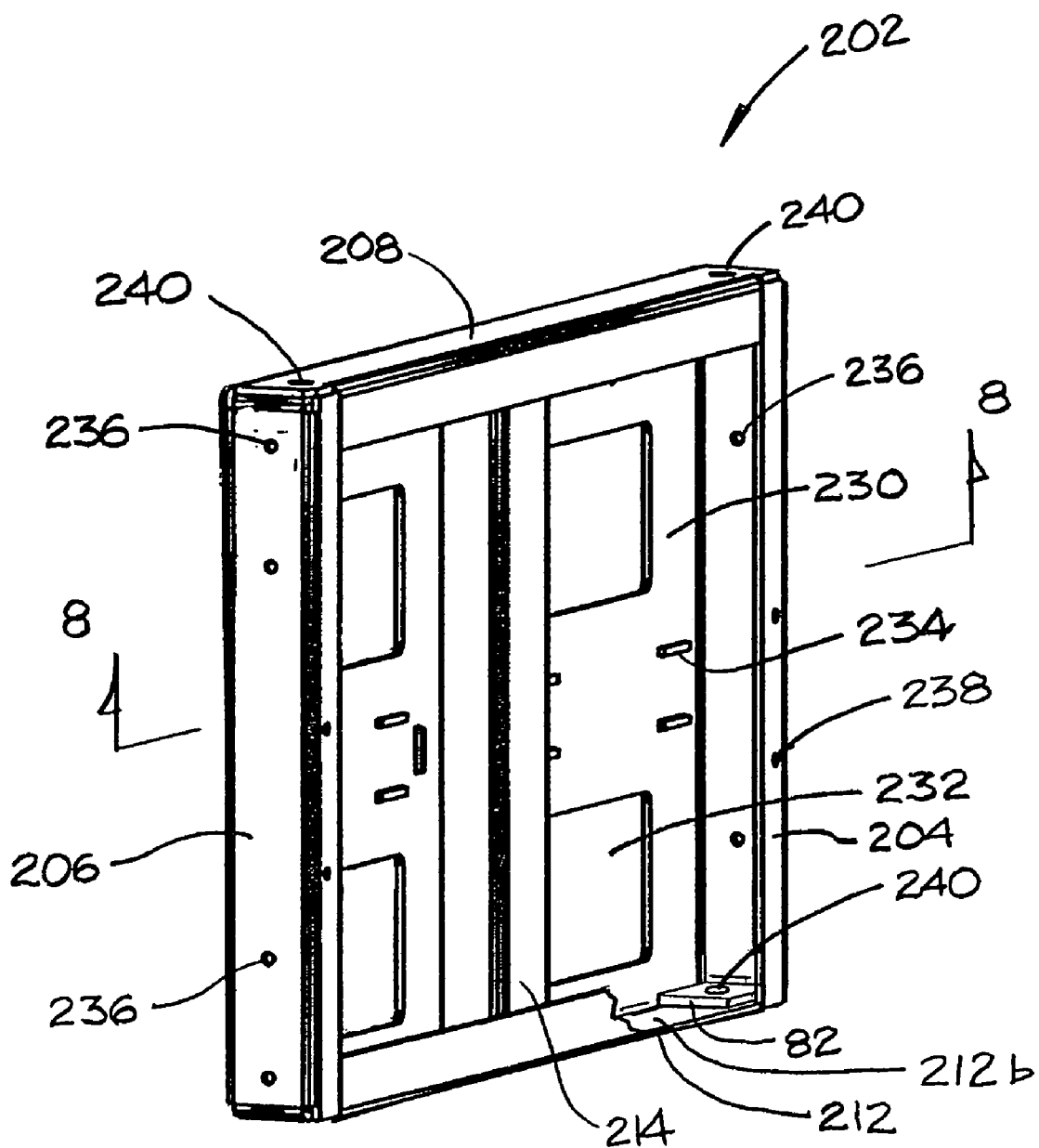
FIG. 7 is perspective view of an end support portion of the stack module shown in FIG. 6 with a portion of its lower horizontal frame member broken away.

One embodiment of a stack module 200 is shown in FIG. 6. In this embodiment, the stack module 200 includes a pair of opposed end supports 202. As shown in FIGS. 6 and 7, each end support 202 includes a pair of opposed vertical frame members 204, 206, an upper horizontal frame member 208, and a lower horizontal frame member 212. A web 230 extends between the vertical frame members 204, 206 and horizontal frame members 208, 212. As shown in FIG. 7, the web 230 preferably includes one or more window openings 232 and a plurality of shelf slots 234 therethrough. The window openings 232 reduce the weight of the web 230 and end support 200, and also permit cooling air flow to reach objects stored in the stack module 200. A vertical stiffening member 214 extends between the upper horizontal frame member 208 and the lower horizontal frame member 212 along the outer face of the web 230. In one embodiment, the vertical stiffening members 214 are U-shaped channels that are welded 70 to the outer faces of the webs 230 as shown in FIG. 8. The stack module end support 202 further includes holes 240 at each corner (only three shown) for use in removably connecting the stack module 200 to a base module 100 or another stack module 200 with threaded fasteners or the like that interconnect with holes 140, 240 in the module below.

As shown in FIG. 6, the stack module 100 further includes two pairs of horizontal shelves or horizontal support members 50 disposed between the end supports 202 in a spaced arrangement. The vertical spacing between adjacent shelves 50 is selected based upon the maximum height of objects to be supported on the shelves 50. For example, for supporting battery cells having a maximum height "x", the vertical spacing between adjacent shelves 50 preferably is slightly greater than "x". One embodiment of a shelf 50 for use in the stack module 200 is shown in FIGS. 4 and 5, and is described above. As in the base module 100, each shelf 50 substantially is constructed of a single sheet of material formed into a C-shaped channel (see FIG. 5). The shelf 50 includes a top panel 52, front and rear sidewalls 54, 55, and two inwardly-facing legs 51, 53. The top panel 52 preferably includes a plurality of window openings 59 and ventilation openings 57. In order to provide lateral support and desired spaces between adjacent objects stored on the shelves 50, a plurality spacer pins 60 are provided that upwardly extend through openings 61 in the top panel 52. Upper ends 62 of the pins 60 protrude above a top surface of the top panel 52. Preferably, the pins 60 also have lower ends 64 that engage a mating opening 63 in the underlying leg 51 to provide added strength and rigidity to the pins 60.

The shelves 50 are welded at each end to the associated end supports 202. In the embodiment of the stack module 200 shown in FIGS. 6 and 9, the shelves 50 include tabs 58 that extend through slots 234 in the web 230 of the end supports 202, and are welded 70 to the web 230. Preferably, the shelves 50 and tabs 58 are substantially identical to the shelves 50 in the base module 100 described above. This welded-tab configuration provides the stack module 100 with substantial strength and rigidity. Preferably, the stack module 200 is designed and constructed to meet or surpass the seismic testing requirements of NEBS GR-63-CORE, Section 4.1.1 (Issue 2, Apr. 2002).

As shown in FIGS. 4 and 6, several sets of aligned ventilation openings 57 are provided in line with and adjacent to the pins 60. As in the base module 100 described above, these ventilation openings 57 permit air flow through the shelves 50 and the intermittent spaces defined between stored objects by the spacer pins 60.

Figure 10:
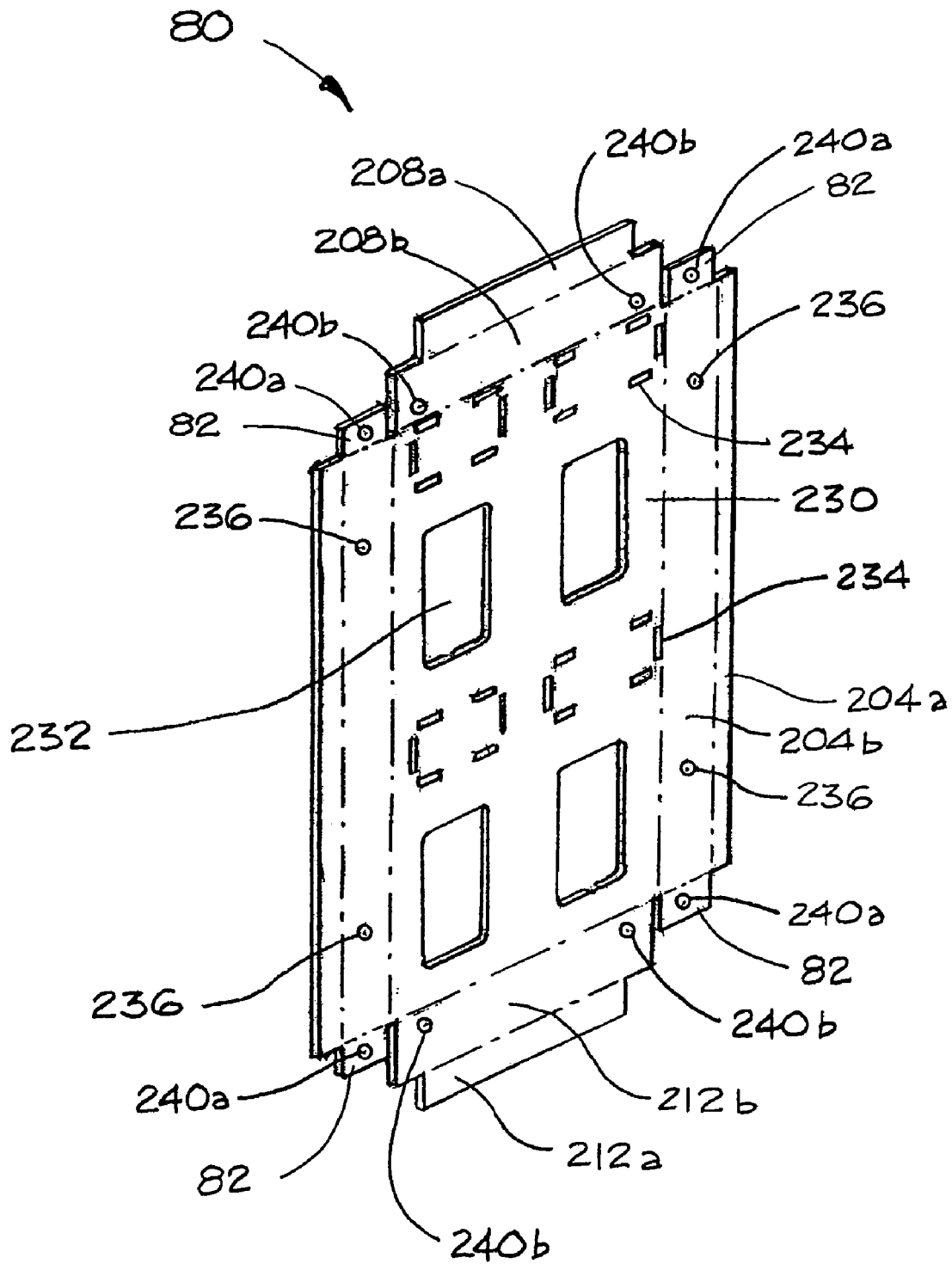
FIG. 10 is a perspective view of single sheet of material for forming a substantial portion of a stack module end support like that shown in FIG. 7.

FIG. 8 shows a cross section of both a base module end support 102 and a stack module end support 202. In a preferred embodiment of the base module 100 as shown in FIGS. 2A and 2B, the web 130, the vertical frame members 104, 106, the upper horizontal frame member 108, and the first lower horizontal frame member 212 are formed from a continuous sheet of material. For example, FIG. 10 shows a configuration of a single sheet of material 80 for forming a substantial portion of a stack module end support 202. Similarly, in a preferred embodiment of the stack module 200 as shown in FIG. 6, the web 230, the vertical frame members

204, 206, the upper horizontal frame member 208, and the lower horizontal frame member 212 are formed from a continuous sheet of material.

For example, FIG. 10 shows a configuration of a continuous sheet of material 80 for forming a substantial portion of a stack module end support 202. In FIG. 10, bend or break lines are shown as dashed lines. The outer configuration of the sheet 80, the window openings 232, the shelf slots 234, and the holes 236, 242*a*, and 242*b* may be punched or machined while the sheet 80 is in a flat state. Once some or most of these features have been formed in the sheet 80, ninety-degree bends are formed along each bend line to yield a final configuration like that shown in FIG. 7. When so formed, adjacent portions 204*a* and 204*b*, and 206*a* and 206*b* of sheet 80 combine to form the vertical frame members 204, 206. Similarly, adjacent portions 208*a* and 208*b* and adjacent tabs 82 of sheet 80 combine to form the upper horizontal frame member 208, and adjacent portions 212*a* and 212*b* and adjacent tabs 82 combine to form the lower horizontal frame member 212. When so formed, holes 240*a* and 240*b* in sheet 80 align to form connecting holes 240 in the stacking module vertical support member 202 as shown in the broken-away portion of FIG. 7. Once the sheet 80 is bent, adjacent edges of the sheet 80 are welded together to provide strength and rigidity to the end supports 202. Alternatively, one or more of the web 230, the vertical frame members 204, 206, the upper horizontal frame member 208, and the lower horizontal frame member 212 may be separate, welded components.

In a preferred embodiment, the end supports 102, 202 and shelves 50 are substantially constructed of 7 gauge (0.1793 inch thick) hot-rolled and pickled (HRPO) sheet steel grade ASTM A569. Other thickness and grades of steel or other materials also may be used.

Figure 12:
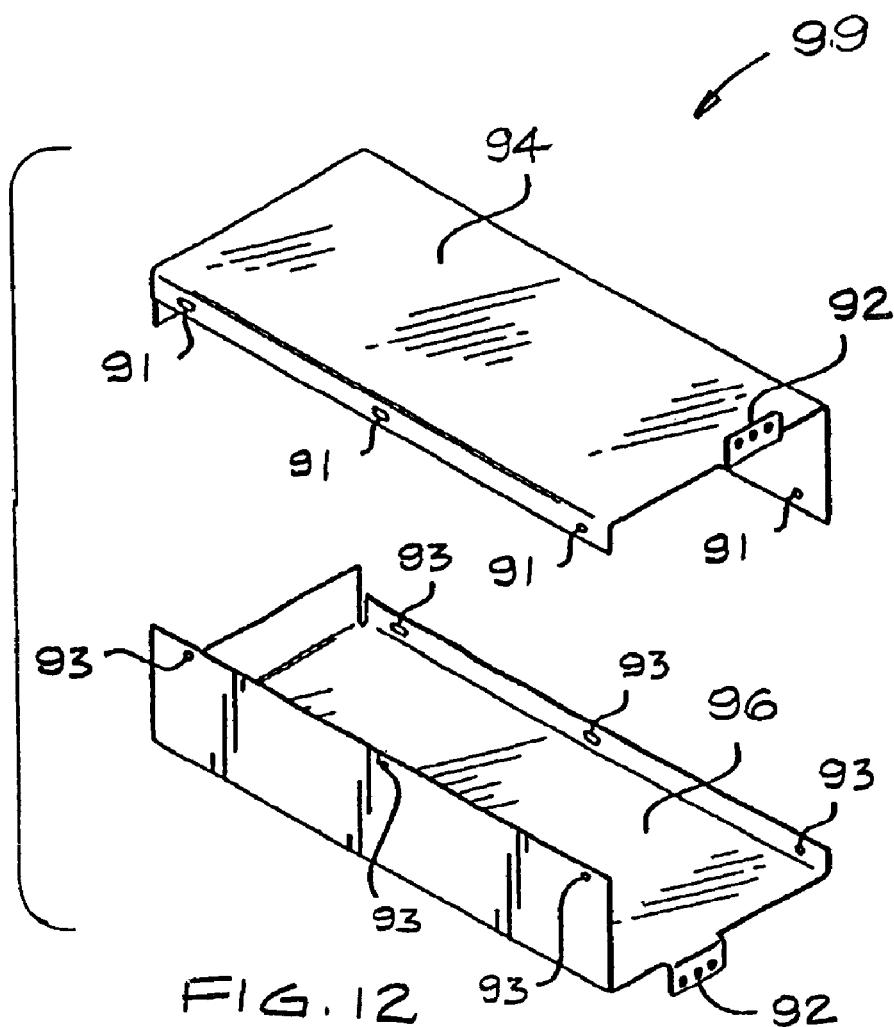
FIG. 12 is an exploded perspective view of a battery cell mounting sleeve for mounting a battery cell in a rack according to the invention as shown in FIG. 11 or FIG. 14.
Figure 13:
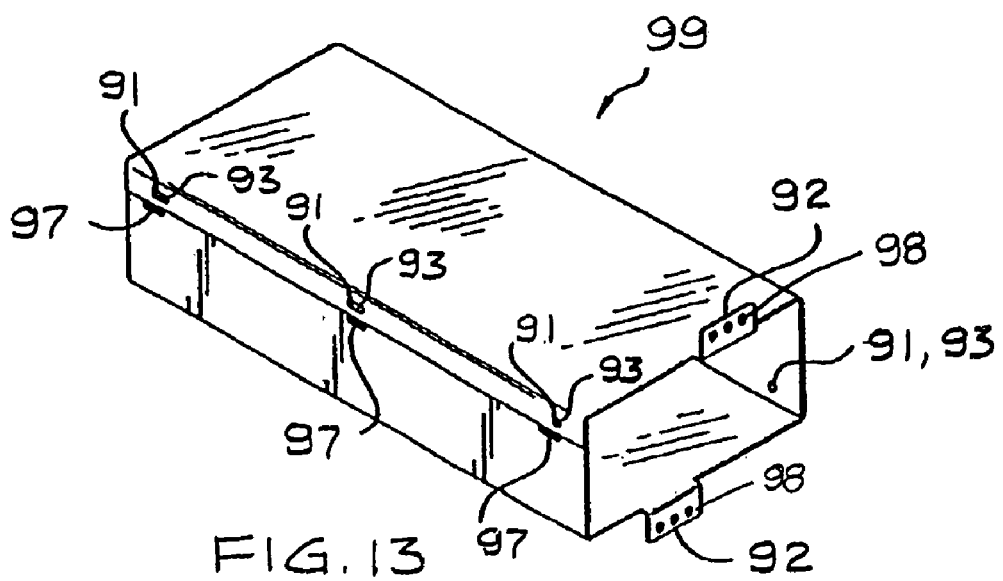
FIG. 13 is a perspective view of a battery cell mounting sleeve for mounting a battery cell in a rack according to the invention as shown in FIG. 11 or FIG. 14.

FIG. 11 shows a rack 10 having an array of battery cells 90 received on and supported by the shelves 50 of a base module 100 and three interconnected stack modules 200. It should be understood hat the present invention contemplates the use of battery cells, either alone, or in sleeves 99 as discussed below. Therefore, the term "battery cell" refers to either situation. As described above, the stacked modules 100, 200 preferably are fastened together by a plurality of threaded fasteners (not shown) engaged in aligned base module connecting holes 140 and stack module connecting holes 240. Prior to insertion into the rack 10, each of the battery cells or jars 90 is inserted into a support sleeve 99 like that shown in FIGS. 12 and 13. As shown in FIG. 12, the support sleeve includes a top half 94 and bottom half 96. The top and bottom halves each include an anchor bracket 92 along a forward edge of the sleeve 99. The halves 94, 96 may be provided with cooperating holes 91 and 93 to align the halves 94, 96 during formation of connecting welds 97 like those shown in FIG. 13.

To mount a battery cell 90 in the rack 10 as shown in FIG. 11, the battery cell 90 is first inserted into a sleeve 99. The battery cell 90 and sleeve 99 are then placed on a shelf support 50 such that at least one edge of the sleeve is adjacent to a pair of aligned spacer pins 60 on the shelf 50. The sleeve 99 and battery cell 90 are inserted into the rack 10 until the brackets 92 on the sleeve are proximate to the forward edge of the foremost shelf 50. Fastening holes 98 in the brackets 92 are configured to substantially align with corresponding mounting holes 56 in the front face of the shelf 50. Threaded fasteners are used to anchor the brackets 92 and sleeves 99 to the shelves 50 and rack 10 using aligned holes 98, 56.

Figure 14:
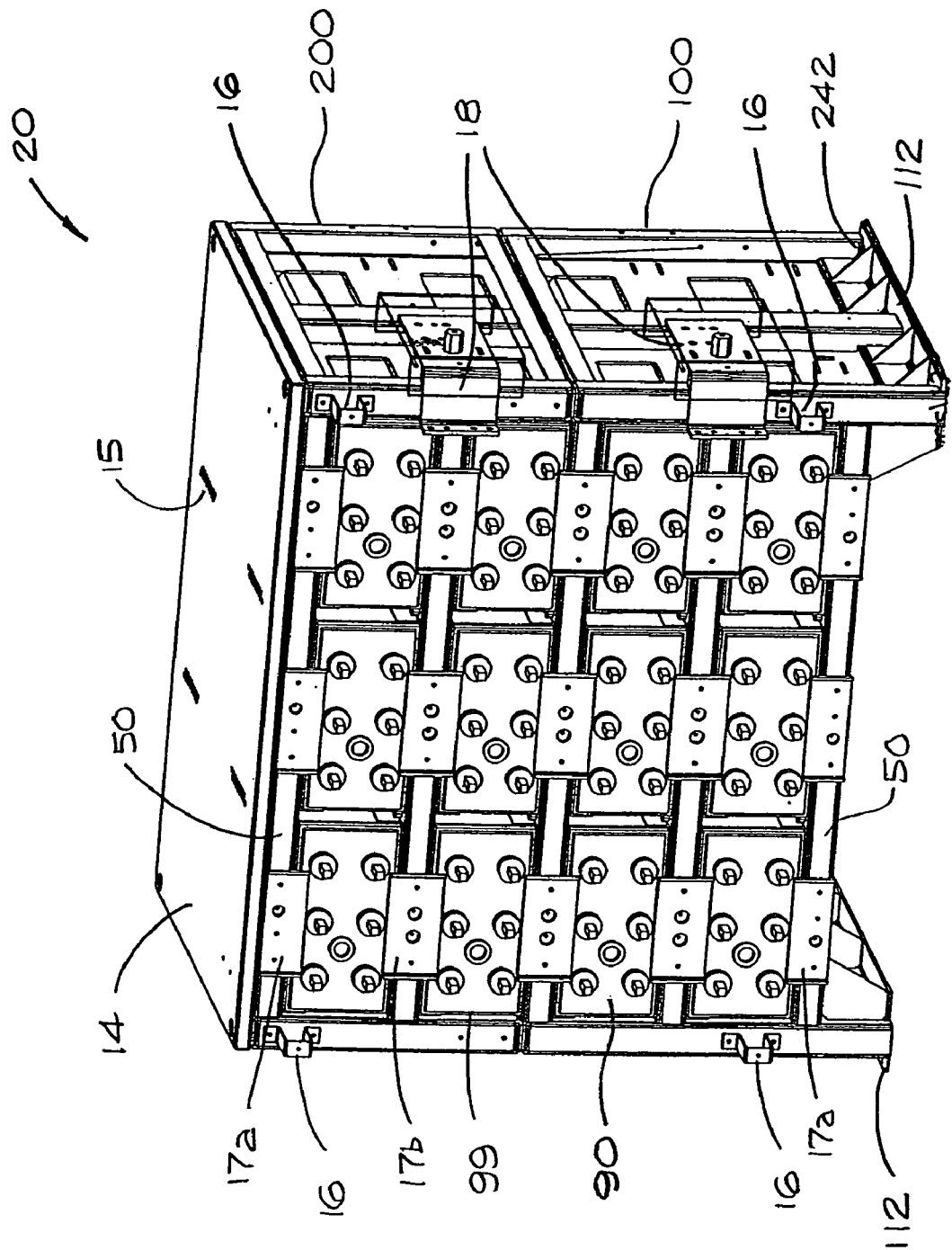
FIG. 14 is a perspective view of an another embodiment of a rack according to the invention having a plurality of battery cells mounted therein.
Figure 15:
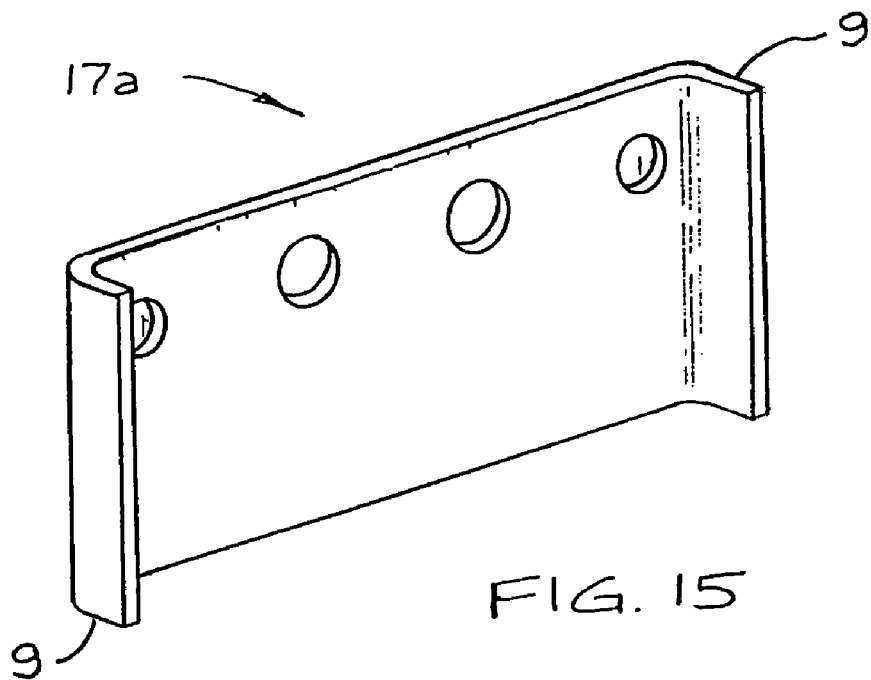
FIG. 15 is a perspective view of a short battery cell retainer plate.
Figure 16:
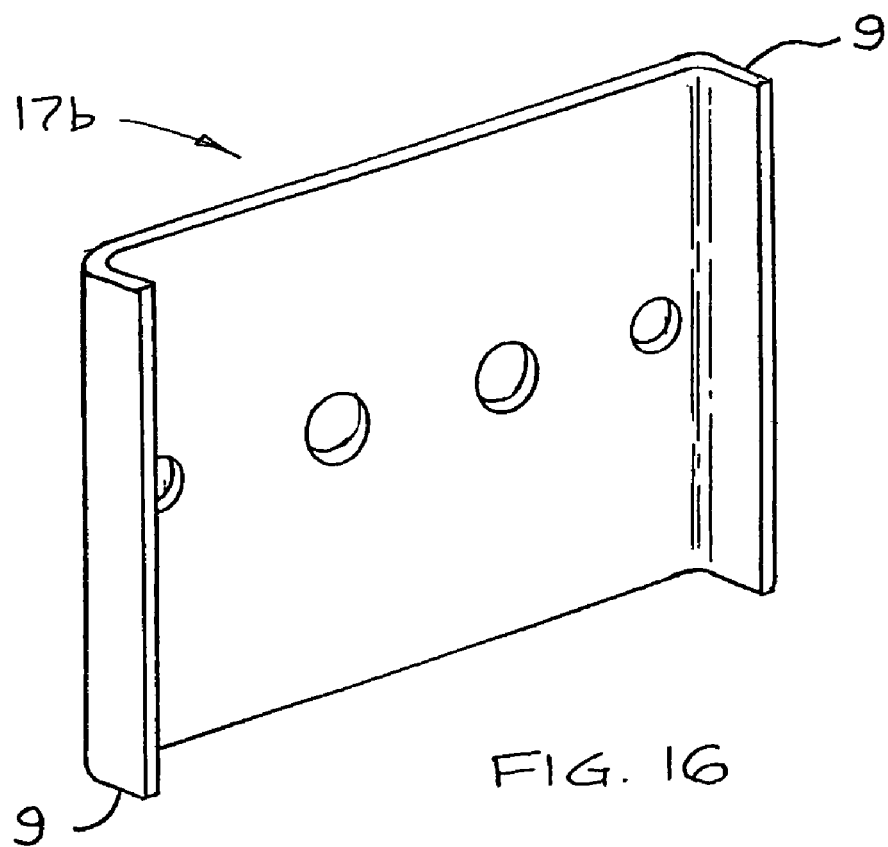
FIG. 16 is a perspective view of a tall battery cell retainer plate.

Once the mounting sleeves 99 are connected to their associated shelves 50, retainer plates 17*a*, 17*b* are mounted on the front faces of the shelves 50 with suitable removable fasteners (not shown) and unused mounting holes 56 in the shelves 50, as shown in FIGS. 1 and 14. The retainer plates 17*a*, 17*b* prevent the battery cells 90 from sliding from the mouths of the mounting sleeves 99 during a seismic event or other physical disturbance of the rack 10. As shown in FIGS. 1 and 14, short retainer plates 17*a* are used along the topmost and lowermost shelves 50, and tall retainer plates 17*b* are used along intermediate shelves 50. The short retainer plates 17*a* act to retain a single battery cell above or below an associated shelf 50, and the tall retainer plates 17*b* act to retain a battery cell both above and below an associated shelf 50. Details of one embodiment of the retainer plates 17*a*, 17*b* are shown in FIGS. 15 and 16. The U-shaped geometry of the retainer plates 17*a*, 17*b* provides the plates with substantial stiffness against bending. The retainer plates 17*a*, 17*b* are assembled on the shelves 50 such that their legs 9 extend outwardly from the shelves 50. As shown in FIG. 11, side terminal buses 18 may be removably mounted on the rack 10 using suitable threaded fasteners.

FIG. 14 shows an embodiment of a smaller 24-volt rack 20 constructed from a single base module 100 and a single stack module 200. In this configuration, the rack 20 has capacity for supporting and storing up to twelve 2-volt telecommunication battery cells 90 in a spaced array, which is half the battery cell storage capacity of the larger rack 10 shown in FIGS. 1 and 11. As will be apparent to persons of ordinary skill in the art, substantially any number of stack modules 200 can be used in combination with a base module 100 to provide a rack having a desired storage capacity. In the preferred embodiments 10, 20, however, storage capacity is provided for either twelve or twenty-four 2-volt battery cells. Like the tall 48-volt rack 10 described above, the smaller 24-volt rack 20 preferably is designed and constructed to meet or surpass the seismic testing requirements of NEBS GR-63-CORE, Section 4.1.1 (Issue 2, Apr. 2002).

Figure 17:
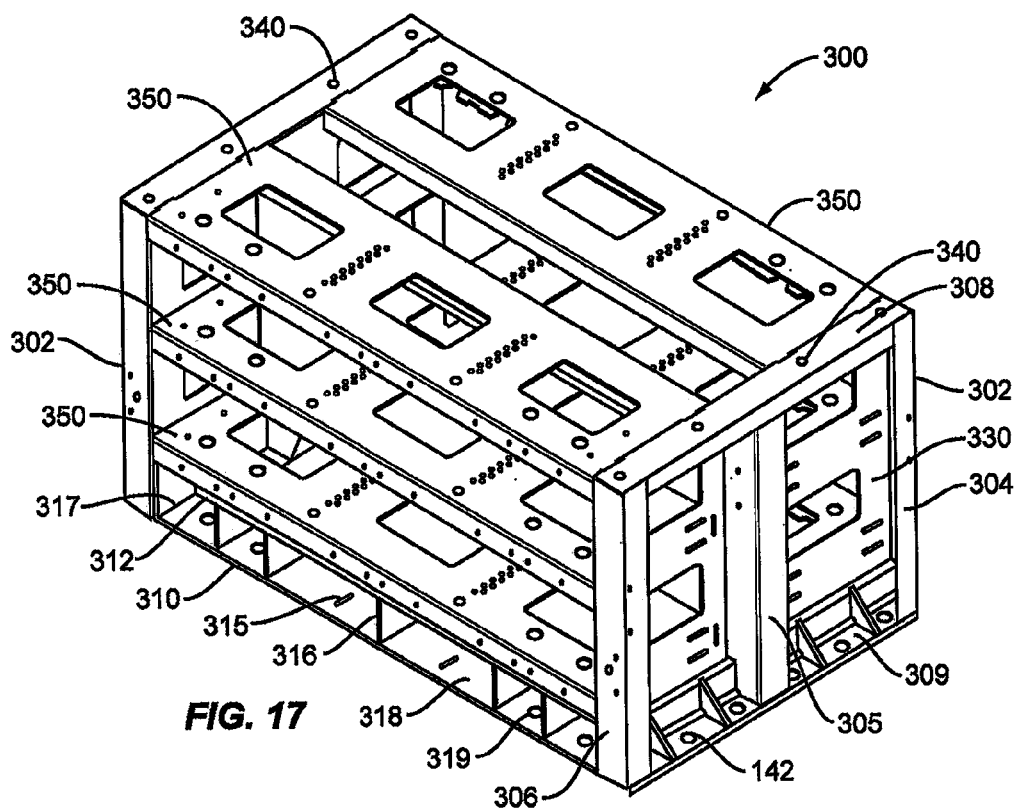
FIG. 17 is a perspective view showing the top and front of the another embodiment of a base module for use in a rack according to the invention.
Figure 18:
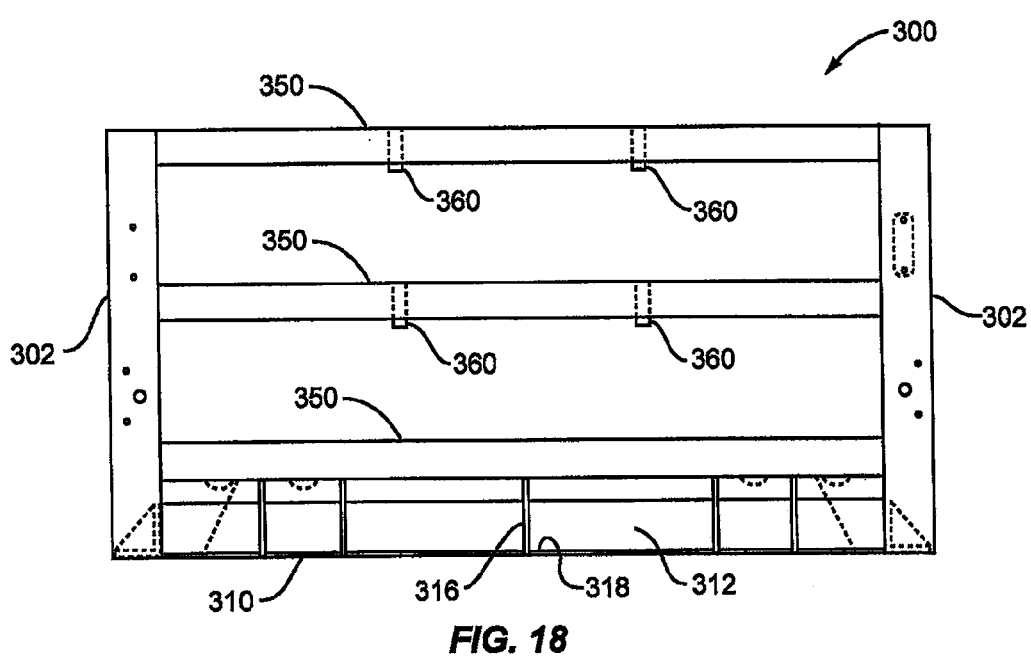
FIG. 18 is a front view of the base module shown in FIG. 17.
Figure 19:
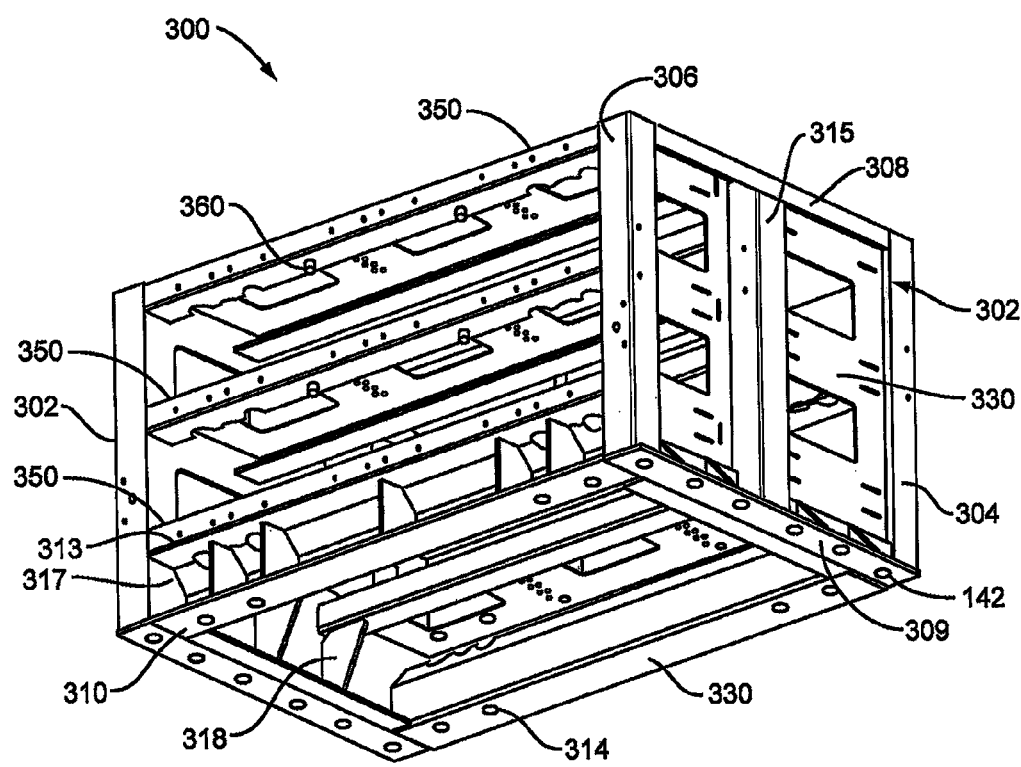
FIG. 19 is a perspective view showing the bottom and front of the base module shown in FIGS. 17 and 18.

Another embodiment of a base module 300 for use in a rack according to the invention (like that shown in FIG. 23) is shown in FIGS. 17-19. The base module 300 is substantially similar to the base module 100 described above, but as shown in FIG. 19, includes a front rail 310 and a rear rail 330 extending between lower ends of a pair of opposed end supports 302. While the front rail 310 and rear rail 330 are different in this embodiment, end supports 302 are the same construction as end supports 102 in Figures 1-10, thereby including opposed vertical frame members 304, 306, an upper horizontal frame member 308, lower horizontal frame member 309 (which corresponds to lower frame members 110, 112), web or elate 330, and a vertical stiffening member 315. Again, the vertical and horizontal frame members and the web are either formed of a sheet of continuous material, or if separate pieces are affixed, as by welding. The front and rear rails 310, 330 provide the base module 300 with increased stiffness and strength as compared to base module 100. As shown in FIGS. 17 and 19, the rails 310, 330 include a plurality of holes 314 for anchoring the base module 300 to a floor or foundation with concrete expansion anchors or the like.

Figure 20:
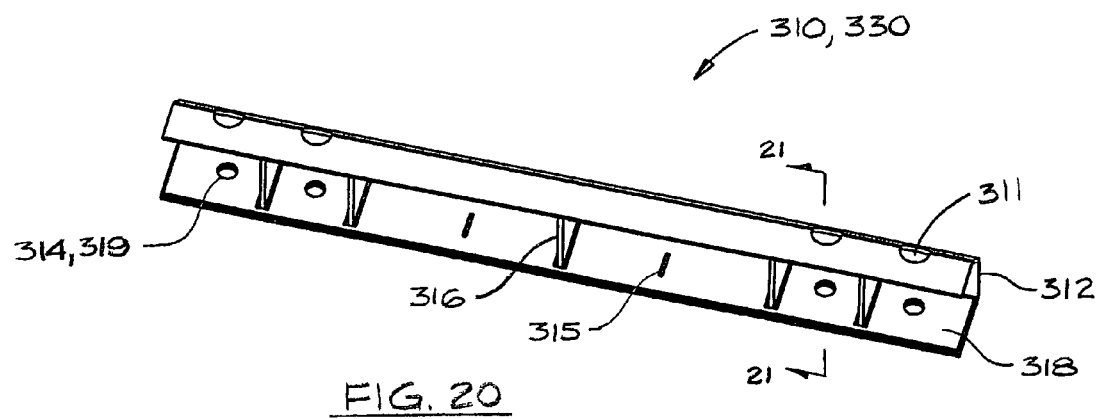
FIG. 20 is a perspective view of a rail portion of the base module shown in FIGS. 17-19.
Figure 21:
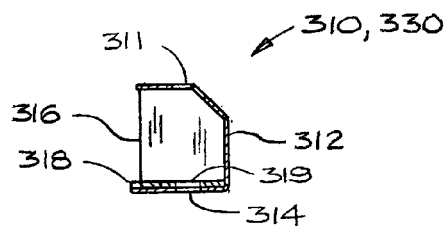
FIG. 21 is a cross-sectional view of the rail of FIG. 20 taken along line 21-21 as indicated in FIG. 20.
Figure 22:
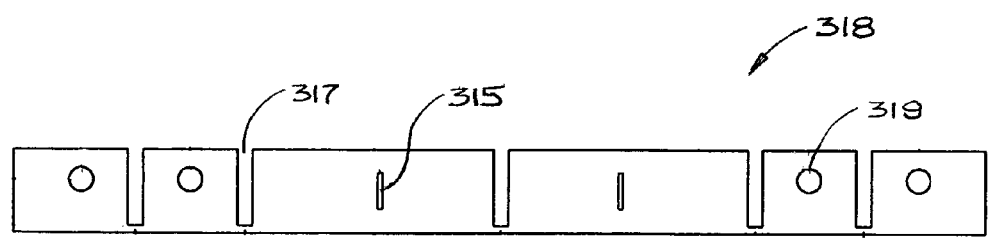
FIG. 22 is a plan view of a support plate portion of the rail shown in FIGS. 20 and 21.

As shown in FIGS. 20 and 21, the front and rear rails 310, 330 include an outwardly-open channel 312. A plurality of spaced gussets 316 are positioned and welded within the channel 312. A support plate 318 like that shown in FIG. 22 is positioned atop a floor of the channel 312. The support plate 318 includes a plurality of slots 317 for receiving the gussets 316. The support plate 318 also includes a plurality of holes 319 that align with the anchor holes 314 in the floor of the channel 312. A plurality of slots 315 are provided for receiving plug welds that attach the support plate 318 to the floor of the channel 312. As shown in FIGS. 17 and 19, the ends of the front and rear rails 310, 330 may be welded to the associated end supports 302 by welds 317. The top edge of each rail 310, 300 may be welded to a lowermost shelf 350 by a plurality of spaced welds 313 as shown in FIG. 19. As shown in FIG. 20, access holes 311 may be provided in the upper leg of the channel 312 to provide access for tightening and loosening anchor fasteners extending through the holes 314, 319.

Figure 23:
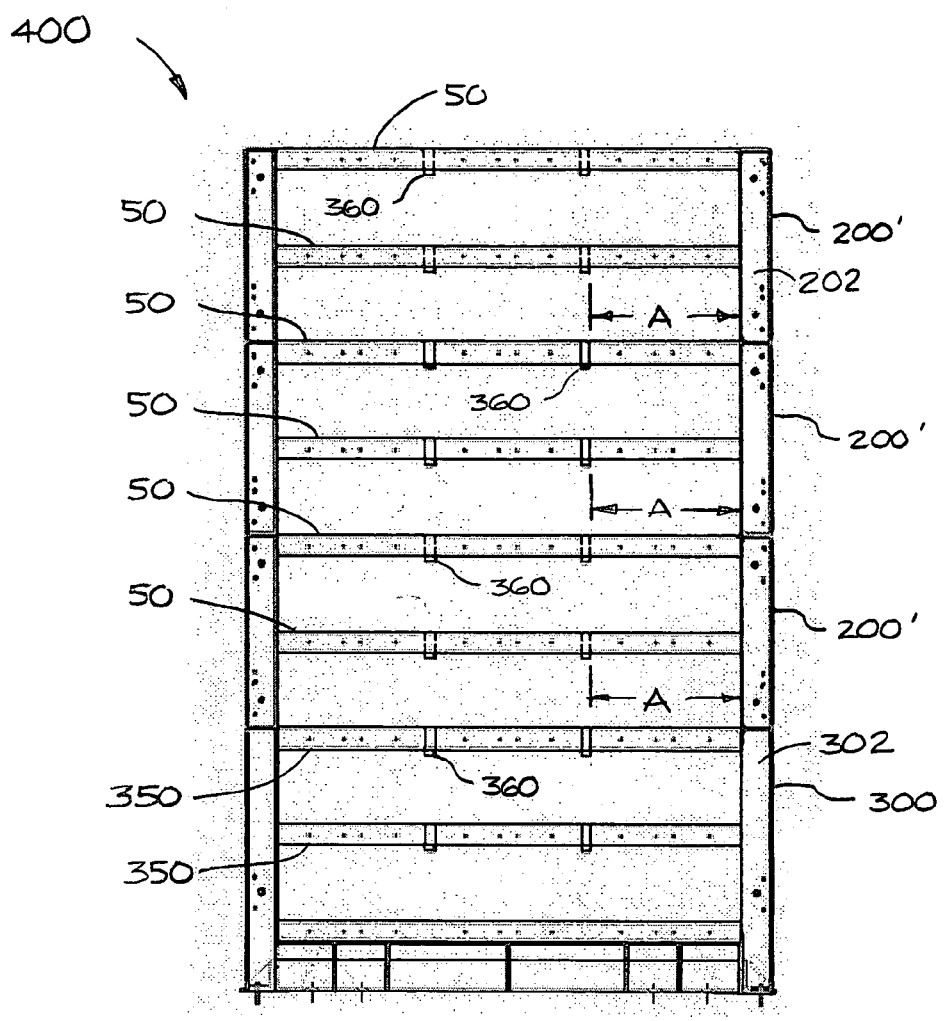
FIG. 23 is front elevation view of an embodiment of a rack according to the invention that includes the base module shown in FIGS. 17-19.
Figure 24:
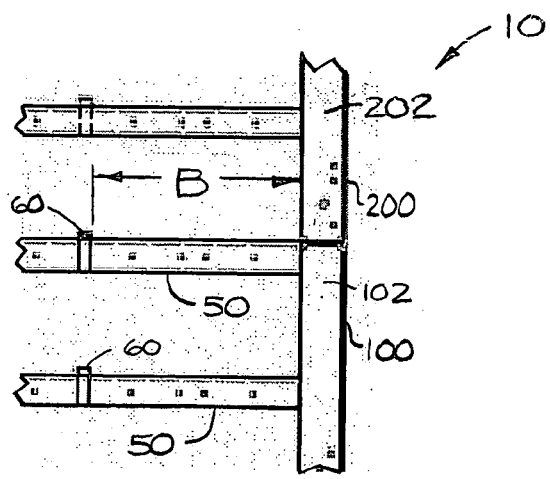
FIG. 24 is a detail elevation view of the front of the rack shown in FIG. 1.

As shown in FIGS. 18 and 19, the base module 300 includes a plurality of spaced pins 360 that downwardly extend from a plurality of spaced shelves 350 that extend between the opposed end supports 302. Like the spacer pins 60 described above for base module 100, the pins 360 provide lateral support and desired spaces between adjacent objects stored on the shelves 350. As shown in FIG. 23, a rack 400 that includes a base module 300 with downwardly projecting pins 360 can be combined with one or more stack modules 200' that also include spacer pins 360 that downwardly extend from shelves 50. In this embodiment of the rack 400, each stack module 200' is substantially the same as the stack module 200 described above, except the upwardly projecting pins 60 (as shown in FIG. 1) are replaced by downwardly projecting spacer pins 360. Upwardly extending pins 60 (FIGS. 1-16) require the pins 60 on an upper shelf of a lower module to locate and separate battery cells positioned beneath a lowermost shelf of a module above. Configuring the pins 360 to downwardly extend from the shelves 350, 50 of the base module 300 and stack modules 200' is desirable in order to prevent unacceptable variation in the distance "A" shown in FIG. 23 caused by misalignment between adjacent modules 300, 200'. As shown in FIG. 23, for a rack 400 having downwardly projecting pins 360, the distance "A" between a pin 360 and a nearest sidewall 202, 302 of a module 200', 300 is unaffected by the relative alignment between adjacent modules. In contrast, as shown in FIG. 24, in a rack 10 having modules 100, 200 with upwardly projecting pins 60, the distance "B" between a pin 60 and a nearest sidewall 202 can be affected by the relative alignment between the lower module 100 and the upper module 200. For example, in FIG. 24, if the upper module 200 is misaligned to the left relative to the lower module 100, the distance "B" is decreased. Conversely, if the upper module 200 is misaligned to the right relative to the lower module 100, the distance "B" is increased. Accordingly, when it is desirable to control the variation in spacing "A", the downwardly projecting pins 360 are an improvement over the upwardly projecting pins 60 previously described.

As shown in FIG. 17, each of the end supports 302 of the base module 300 includes a plurality of base module connecting holes 340. At least four holes 340 on each upper horizontal frame member of each end support 302 are sized and positioned to align with corresponding holes in a stack module 200', and to receive threaded fasteners that removably connect the base module 300 to the stack module 200'. Similarly, associated stack modules may include at least four corresponding holes 240 (though only two are shown in FIG. 6) for receiving threaded fasteners that removably connect the a stack module 200' to a base module 300 or to another stack module 200'.

The above detailed description of exemplary embodiments of the invention is provided to illustrate the various aspects of the invention, and is not intended to limit the scope of the invention thereto. Persons of ordinary skill in the art will recognize that certain modifications can be made to the described embodiments without departing from the invention. For example, while the above-described embodiments of the invention have been principally described in connection with the storage of battery cells for backup power systems or UPS's, a storage system according to the invention may also be configured and used to support other objects or equipment. All such modifications are intended to be within the scope of the appended claims.

What is claimed is:

1. A storage rack used for storing an array of battery cells in an uninterrupted power source that at least meets the seismic testing requirements of NEBS GR-63-CORE (Issue 2, Apr. 2002), the rack comprising:
   (a) a pair of opposed end supports, each end support comprising opposed vertical frame members, opposed horizontal upper and lower frame members, and a web extending substantially between the entire length of the vertical frame members and substantially between the entire length of the upper and lower horizontal frame members, the vertical frame members and horizontal frame members being permanently affixed to the web;
   (b) a rail extending between the front and rear sides of the lower end of the opposed end supports, both the rails and the lower frame members of the opposed end supports including a plurality of holes through which concrete expansion anchors pass for anchoring the storage rack to a foundation;
   (c) a plurality of shelves extending between the end supports; and
   (d) wherein the shelves and the rail are welded to the end supports.

2. A storage rack according to claim 1 wherein the rail also is welded to at least one of the shelves.

3. A storage rack according to claim 1 wherein the shelves are welded to the webs of the end supports.

4. A storage rack according to claim 1 wherein the end supports include slots therein and the shelves include tabs engaged in the slots.

5. A storage rack according to claim 4 wherein the slots are in the webs of the end supports.

6. A storage rack according to claim 1 wherein the web of each end support further includes at least one vertical stiffening member.

7. A storage rack according to claim 1 wherein the lower of the horizontal frame members of each end support comprises a vertical leg, a horizontal leg, and a plurality of gussets extending between the horizontal leg and the vertical leg.

8. A storage rack according to claim 1 and further including one or more removably connected rack modules stacked atop the rack of claim 1, each of the connected rack modules including:
   (a) a pair of opposed end supports, each end support comprising opposed vertical frame members, opposed horizontal upper and lower frame members, and a web extending substantially between the entire length of the vertical frame members and substantially between the entire length of the upper and lower horizontal frame members, the vertical frame members, and horizontal frame members being permanently affixed to the web;
   (b) a plurality of shelves extending between the end supports;
   (c) the lower horizontal frame member of each end support being connected to the upper horizontal frame member of the end support of the rack or module therebelow; and
   (d) wherein the shelves are welded to the end supports.

9. A storage rack according to claim 1 wherein the opposed vertical frame members, the opposed horizontal frame members, and the web of each end support are formed from a continuous sheet of material.

10. A storage rack according to claim 1 wherein the web of each end support includes at least one window opening therein.

11. A storage rack according to claim 1 wherein the rail extends between a first vertical frame member of one end support, and a corresponding vertical frame member of the other end support.

12. A storage rack according to claim 1 comprising at least two rails, each extending between the corresponding vertical frame members of the opposed end supports.

13. A storage rack according to claim 1, and further comprising a plurality of pins downwardly extending from at least one of the plurality of shelves, each pin being configured to at least partially locate and support at least one battery cell in the array of battery cells.

14. A modular rack for supporting a plurality of battery cells in spaced arrangement in an uninterrupted power source that at least meets the seismic testing requirements of NEBS GR-63-CORE (Issue 2, Apr. 2005), the rack comprising:
   (a) a base module configured to receive and support a first group of battery cells in a first spaced array, the base module comprising:
      (i) a pair of opposed end supports, each end support comprising opposed vertical frame members, opposed horizontal upper and lower frame members, and a web extending substantially between the entire length of the vertical frame members and substantially between the entire length of the upper and lower horizontal frame members, the vertical frame members and horizontal frame members being permanently affixed to the web;
      (ii) a rail extending between the front and rear sides of the lower end of the opposed end supports, both the rails and the lower frame members of the opposed end supports including a plurality of holes through which concrete expansion anchors pass for anchoring the storage rack to a foundation;
      (iii) a plurality of shelves extending between the end supports;
      (iv) wherein the shelves and rail are welded to the end supports;
   (b) a first stack module configured to receive and support a second group of battery cells in a second spaced array; and
   (c) wherein the first stack module is configured to be stacked atop the base module and to be removably connected thereto.

15. A modular rack according to claim 14 wherein the rail also is welded to at least one of the shelves.

16. A modular rack according to claim 14 and further comprising a second stack module configured to receive and support a third group of battery cells in a third spaced array, wherein the second stack module is configured to be stacked atop the first stack module and to be removably connected thereto.

17. A modular rack according to claim 16 and further comprising a third stack module configured to receive and support a fourth group of battery cells in a fourth spaced array, wherein the third stack module is configured to be stacked atop the second stack module and to be removably connected thereto.

18. A modular rack according to claim 16 wherein the first and second stack modules have substantially the same configuration.

19. A modular rack according to claim 17 wherein the first, second, and third stack modules have substantially the same configuration.

20. A modular rack according to claim 14 wherein the base module is configured to be removably attached to a foundation through the rails and through the lower horizontal frame members.

21. A modular rack according to claim 14, and further comprising a plurality of pins downwardly extending from at least one of the plurality of shelves of the base module, each pin being configured to at least partially locate and support at least one battery cell in the plurality of battery cells.

22. A modular rack according to claim 14, wherein each module is connected to the module below by at least four threaded fasteners connecting each lower horizontal frame member to the corresponding upper frame member of the module therebelow.

* * * * *